United States Patent [19]
Finkleman

[11] Patent Number: 5,878,249
[45] Date of Patent: Mar. 2, 1999

[54] METHOD FOR SYNCHRONIZING THE SIMULATION OF THE ENVIRONMENT OF A REAL-TIME SYSTEM

[75] Inventor: David Finkleman, Yehuda, Israel

[73] Assignee: Ido East Systems, Ltd., Midreshet Sde Boker, Israel

[21] Appl. No.: 769,852

[22] Filed: Dec. 19, 1996

[51] Int. Cl.$^6$ ........................................................ G06F 1/04
[52] U.S. Cl. ............................................ 395/551; 395/560
[58] Field of Search ................................... 395/551, 550, 395/500, 560; 364/176, 177, 488–490, 578

[56] References Cited

U.S. PATENT DOCUMENTS

| | | | |
|---|---|---|---|
| 3,786,242 | 1/1974 | Brooks | 364/802 |
| 5,363,319 | 11/1994 | Okuda | 364/578 |
| 5,649,176 | 7/1997 | Selvidge et al. | 395/551 |

*Primary Examiner*—Thomas M. Heckler
*Attorney, Agent, or Firm*—Mark M. Friedman

[57] ABSTRACT

A method for synchronizing an environment simulator with a real-time system. If the clock speed of the system microprocessor is so fast, and/or the process being simulated is so complicated, that the simulator cannot keep up with the microprocessor, then the microprocessor is slowed down to match the speed of the simulator, either by temporarily disabling the clock oscillator of the microprocessor, or by decreasing the frequency of the clock oscillator of the microprocessor. The system responses to the simulated environment are recorded, and displayed with response times adjusted back to the original speed of the microprocessor.

12 Claims, 3 Drawing Sheets

A

B

C

D

Time →

METHOD FOR SYNCHRONIZING THE SIMULATION OF THE ENVIRONMENT OF A REAL-TIME SYSTEM

FIELD AND BACKGROUND OF THE INVENTION

The present invention relates to the simulation of a real-time system controlled by a microprocessor-driven controller, and, more particularly, to a method for synchronizing the simulation with the activity of the microprocessor.

Many electronic devices are run by microprocessors under software control. Examples of such devices include automatic control systems such as vehicular fuel injection systems, and computer embedded electronic devices generally. These devices are characterized by an intensive real-time exchange of electronic signals between the controller and its environment. In this context, the "environment" of the controller consists of peripheral components, some of which produce signals indicative of conditions in the device under control. These signals may be digital signals or analog signals. In either case, the microprocessor periodically samples the signals at a certain sampling rate.

The thorough debugging and testing of software-controlled systems has been an ongoing challenge to system developers, and is an ongoing topic of intensive research. The debugging and testing of real-time systems in a real world environment often is impractical, or even dangerous, for several reasons:

(a) The environment to which the system must respond often is not conveniently available to the developer.

(b) The critical emergency conditions that these systems must respond to often are sufficiently unusual not to be encountered even in a well-planned series of shake-down tests.

(c) An undebugged system is likely to respond incorrectly to such an emergency condition, endangering both the system and the developer.

One successful and very popular approach to this problem has been to employ simulators. A digital simulator is a computer-embedded system that models the events of the system under control and the responses of the system itself and, on the basis of the modeling, generates the corresponding signals that would be presented to the microprocessor for sampling. Instead of connecting the controller to the peripherals, the controller is connected to the simulator, and the interaction of the microprocessor with simulated signals is monitored to see if the microprocessor responds as expected. Such a simulator may be used generally for the debugging, testing and evaluation of embedded systems.

One problem that arises in these simulations is that the simulator may not be able to model the external events fast enough to keep up with the controller's sampling rate. For example, a fuel injection system programmed to optimize fuel economy and engine power must react to a variety of external parameters, such as atmospheric pressure, temperature and humidity, and including parameters, such as engine temperature and cylinder pressure, which are themselves functions of the behavior of the fuel injection system. A simulator must perform many computations to model all these parameters at a high sampling rate, and this is not always possible in real time because of the limited compute power of the simulator.

There is thus a recognized need for, and it would be highly advantageous to have, a method of testing a real-time system, using a simulator, in which the simulator does not have to model external events as fast as the real-time system responds to them.

SUMMARY OF THE INVENTION

According to the present invention there is provided A method for synchronizing the simulation of the environment of a controller driven by a clock oscillator and responsive to signals from the environment, the controller having a first response time, the method comprising: reversibly disabling the clock oscillator.

According to the present invention there is provided A method for synchronizing the simulation of the environment of a controller driven by a clock oscillator that operates at a certain oscillator frequency, the controller responding to signals from the environment at a first response frequency, the method comprising the steps of: (a) emulating the signals from the environment using a simulator having a second response frequency different than the first response frequency by a factor; and (b) changing said oscillator frequency by said factor.

The present invention is based on the fact that the only information about time available to the controller is the timing pulses that come from its microprocessor's clock oscillator. Thus, the simulator can take as long as it needs to model external events, if the controller's microprocessor can be fooled, by manipulation of the clock oscillator, into sampling the simulated signals only as fast as the simulator can produce them. Simply put, the first variant of the method of the present invention is to "turn off" the oscillator clock of the microprocessor long enough to allow the simulator to "catch up" to the microprocessor. The actions performed by the microprocessor after the oscillator is turned back on then are precisely those that it would have performed in real time in response to the events being modeled by the simulator. The second variant of the method of the present invention is to change the frequency of the oscillator clock of the microprocessor so that the microprocessor responds to the simulated external events as fast as the simulator can model them. Again, the actions performed by the microprocessor then are precisely those that it would have performed in real time in response to the events being modeled by the simulator. Anthropomorphically, the microprocessor "thinks" that the simulated events are occurring at the rate that they would occur in reality, and reacts accordingly. This variant applies both to the usual cases in which the simulator cannot keep up with the microprocessor, in which cases the oscillator clock is slowed down, and to the rare cases in which the simulator is capable of modeling external events faster than the microprocessor must respond to them, in which cases the oscillator clock is speeded up. The simulator includes code for predicting how long it takes to compute each simulated signal, and so knows when to turn off the oscillator clock under the first variant, or when to change the oscillator clock frequency under the second variant, and for how long.

In both variants, the sequence of events modeled by the simulator, and of signals exchanged between the simulator and the microprocessor, are recorded. The actual times of the simulated events and signals are replaced with the nominal times at which those events and signals would have occurred in a real environment. The record with nominal times is displayed to the developer. Thus, the timing distortions created by the present invention are invisible both to the microprocessor and to the developer.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method for simulating real-time systems. Specifically, the present invention can be used to debug, test, evaluate or demonstrate a real-time system using a simulator that models the environment, within which the system functions, at a different speed than real time.

The method of synchronizing a simulator and a real-time system according to the present invention may be better understood with reference to the drawings and the accompanying description.

The manufacturers of variable clock oscillators supply instructions on how to reversibly disable the oscillators or change their output frequencies. For example, the output frequency of the Voltage Control Crystal Oscillator manufactured by Vectron Technologies Inc. of Hudson N.H., may be controlled, between 183 Hz and 52 MHz, by applying an appropriate control voltage to one of its pins. The oscillator may be disabled temporarily by applying a "TTL logic low" signal to another one of its pins.

Figure 3:
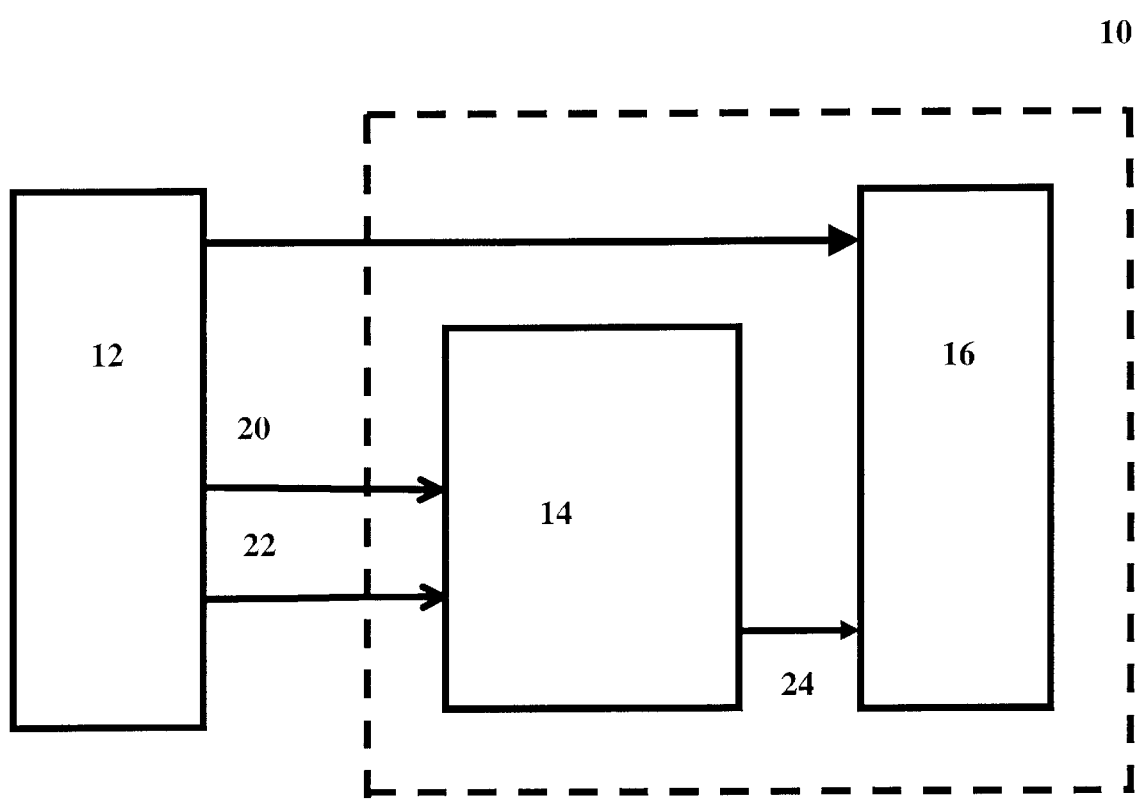
FIG. 3 is a block diagram of a real time system being debugged with the help of a simulator.

Referring now to the drawings, FIG. 3 shows a real-time system 10 receiving signals 18 from a simulator 12. System 10 includes a microcontroller 16 that receives pulses 24 from a clock oscillator 14. Microcontroller 16 counts pulses 24 and samples the current emulated signal 18 whenever the count of pulses 24 reaches a predetermined integer. Simulator 12 compares, to the time required for microprocessor 16 to sample successive signals 18, the time required to compute successive signals 18 and to make these successive signals 18 ready for sampling by microcontroller 16. Under the first variant of the present invention, if this computation time exceeds the sampling time, simulator 12 then sends an appropriate signal 20 to clock oscillator 14 to temporarily disable clock oscillator 14. For example, if clock oscillator 14 is the Voltage Control Crystal Oscillator of Vectron Technologies mentioned above, then signal 20 is a "TTL logic low" signal. Under the second variant of the present invention, if this computation time exceeds the sampling time, simulator 12 then applies a control voltage 22 to the appropriate pin of clock oscillator 14 to change the output frequency of pulses 24.

Figure 1:
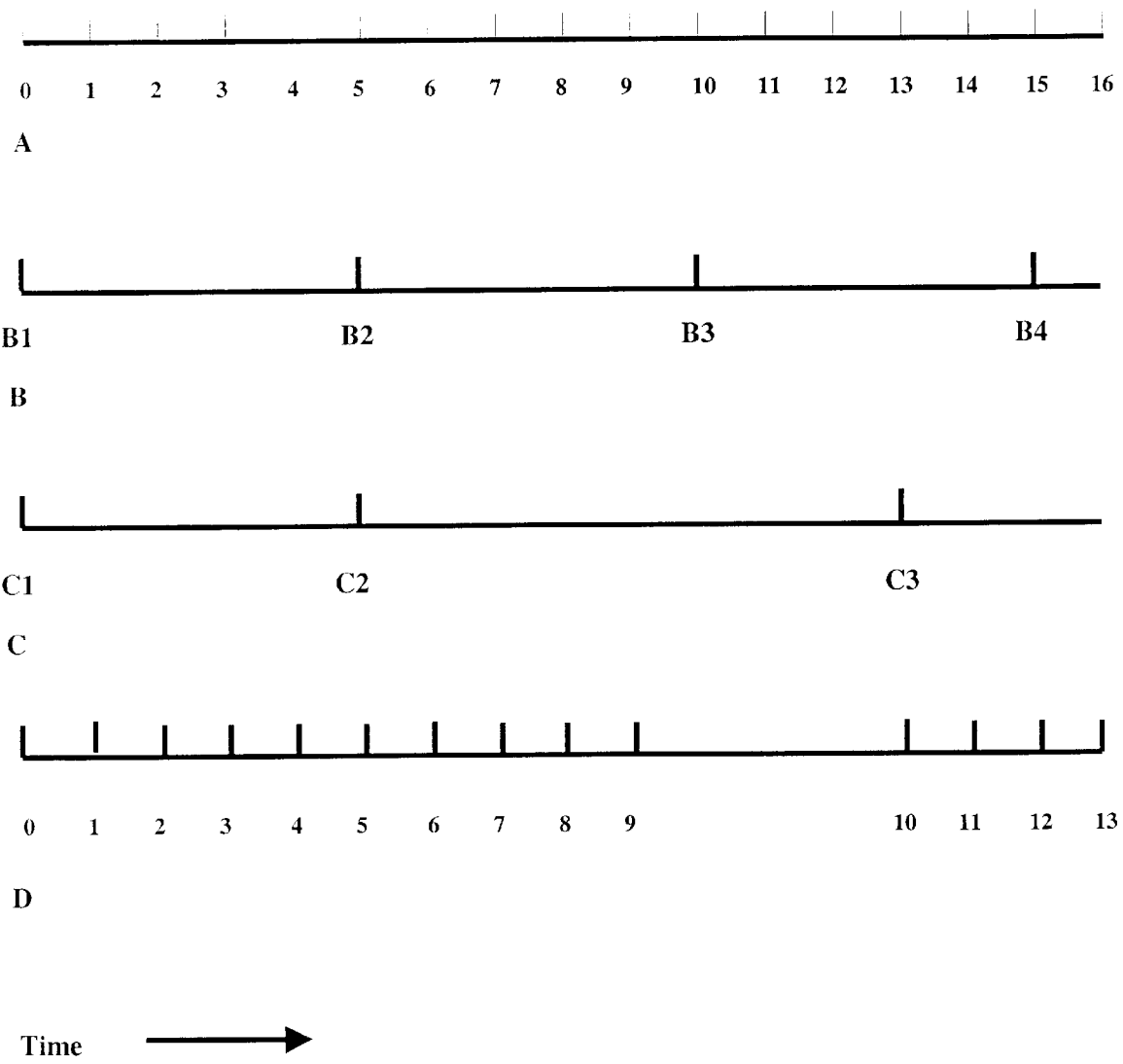
FIG. 1 shows pulse trains associated with a real-time system being debugged by the first variant of the method of the present invention.

The first variant of the present invention, disabling clock oscillator 14 long enough for simulator 12 to catch up, is feasible with microprocessors 16 based on static CMOS. Referring now to the drawings, FIG. 1 shows several pulse trains that illustrate this variant. Pulse train A is the uniform sequence of pulses 24 of clock oscillator 14 during normal operation. Pulse train B represents the timing of the sampling of signals 18 by microprocessor 16 in a real environment: one sampling every five oscillator pulses 24. Signal $B_1$ is sampled at oscillator pulse 0. This is represented in FIG. 1 by the label "$B_1$" on a pulse coincident with oscillator pulse 0. Similarly, signal $B_2$ is sampled at oscillator pulse 5, signal $B_3$ is sampled at oscillator pulse 10, and signal $B_4$ is sampled at oscillator pulse 15. Pulse train C represents the simulator's estimate of times at which various simulated signals 18 are computed and ready for sampling. Simulated signal $C_1$ is computed and ready for sampling at oscillator pulse 0, and simulated signal $C_2$ is computed and ready for sampling at oscillator pulse 5, as required; but simulated signal $C_3$ is not ready for sampling until oscillator pulse 13, after a lag of 3 oscillator pulse periods behind signal $B_3$. Under the first variant of the method of the present invention, simulator 12 predicts that it will take eight oscillator pulse periods to model signal $B_3$, so clock oscillator 14 is turned off at oscillator pulse 9, as shown in pulse train D, and turned back on again three oscillator pulse periods later. Thus, microprocessor samples simulated measurement $C_3$ at oscillator pulse 10, as it should.

Figure 2:
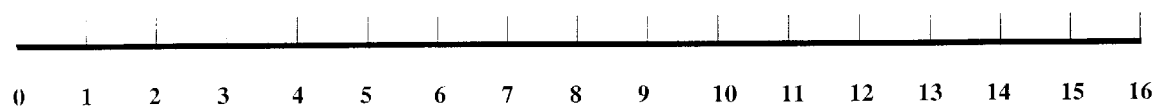
FIG. 2 shows pulse trains associated with a real-time system being debugged by the second variant of the method of the present invention.
Figure 2:
Figure 2:
Figure 2:
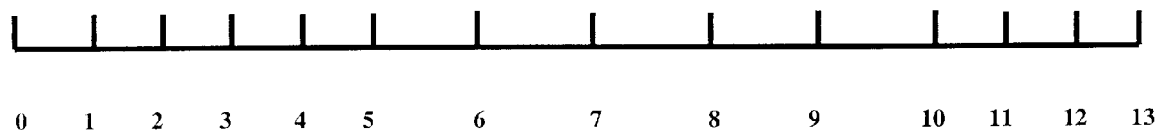

The second variant of the present invention, changing the clock oscillator frequency, is feasible with microprocessors 16 based on a wide variety of technologies: CMOS, NMOS, TTL, etc. FIG. 2 shows several pulse trains that illustrate this variant of the present invention, as used with real-time system 10. Pulse trains A and B are as in FIG. 1. Simulator 12 predicts that five normal oscillator pulse periods are needed to compute simulated signal $C_2$, matching the timing of real-time signal $B_2$ relative to real-time signal $B_1$, but eight normal oscillator pulse periods are needed to compute simulated signal $C_3$. Accordingly, simulator 12 temporarily slows down oscillator 14 at pulse 5. Specifically, the output frequency of clock oscillator 14 is decreased, by a factor of ⅝, to match the simulator's effective response frequency in modeling signal $B_3$, which is ⅝ of the real-time frequency. Again, microprocessor 16 samples simulated signal $C_3$ at oscillator pulse 10, as it should. Normally, simulator 12 then would restore oscillator 14 to its normal output frequency, unless simulator 12 predicts that it would take more than five normal oscillator pulse periods to compute the next simulated signal, $C_4$.

While the invention has been described with respect to a limited number of embodiments, it will be appreciated that many variations, modifications and other applications of the invention may be made.

What is claimed is:

1. In a simulation of environmental signals sampled by a controller according to a sampling time determined using a clock oscillator, successive simulated signals being computed by a simulator, a method for synchronizing the simulator with the controller, comprising the steps of: for each of the successive simulated signals (a) estimating a computation time required by the simulator to compute said each successive simulated signal; and (b) if said estimated computation time exceeds the sampling time, reversibly disabling the clock oscillator.

2. The method of claim 1, wherein the clock oscillator is disabled for a duration at least as long as a difference between said each computation time that exceeds the sampling time and the sampling time.

3. The method of claim 1, further comprising the step of:

(c) if said estimated computation time exceeds the sampling time, enabling the clock oscillator after said each successive simulated signal has been computed.

4. In a simulation of environmental signals sampled by a controller at a certain sampling frequency determined using a clock oscillator operating at a certain oscillator frequency, the simulated signals being computed by a simulator at a certain modeling frequency a method for synchronizing the simulator with the controller, comprising the steps of:

(a) comparing the modeling frequency to the sampling frequency to obtain a factor by which the modeling frequency differs from the sampling frequency; and (b) changing the oscillator frequency by said factor.

5. The method of claim 4, wherein said modeling frequency is less than the sampling frequency, said changing being effected by decreasing the oscillator frequency by said factor.

6. The method of claim 4, wherein said modeling frequency is greater than the sampling frequency, said changing being effected by increasing the oscillator frequency by said factor.

7. In a system including a controller responsive to a plurality of signals from an environment according to a sampling time determined using a clock oscillator, a method for simulating the environment, comprising the steps of:

(a) simulating each of said signals successively;

(b) estimating a computation time for said simulating of said each signal; and (c) for each of said computation times that exceeds the sampling time, reversibly disabling the clock oscillator.

8. The method of claim 7, wherein the clock oscillator is disabled for a duration at least as long as a difference between said each computation time that exceeds said sampling time and the sampling time.

9. The method of claim 7, further comprising the step of:

(d) for each of said computation times that exceeds the sampling time, enabling the clock oscillator after said simulation of said each signal has been completed.

10. In a system including a controller driven by a clock oscillator operating at a certain oscillator frequency to enable the controller to sample signals from an environment at a certain sampling frequency, a method for simulating the environment, comprising the steps of:

(a) providing a simulator operative to simulate said signals at a certain modeling frequency different than the sampling frequency by a factor; and (b) changing the oscillator frequency by said factor.

11. The method of claim 10, wherein said modeling frequency is less than the sampling frequency, said changing being effected by decreasing the oscillator frequency by said factor.

12. The method of claim 10, wherein said modeling frequency is greater than the sampling frequency, said changing being effected by increasing the oscillator frequency by said factor.

* * * * *